United States Patent [19]

Kistler et al.

[11] 4,185,988

[45] Jan. 29, 1980

[54] ANTICAKING COMPOSITIONS

[75] Inventors: Jean P. Kistler; Michel Guinot, both of Mont-Saint-Aignan, France

[73] Assignee: Exxon Research & Engineering Co., Florham Park, N.J.

[21] Appl. No.: 928,816

[22] Filed: Jul. 28, 1978

Related U.S. Application Data

[63] Continuation of Ser. No. 728,970, Oct. 4, 1976, abandoned.

[30] Foreign Application Priority Data

Oct. 2, 1975 [GB] United Kingdom ............... 40320/75

[51] Int. Cl.² .................................................. C05G 3/00
[52] U.S. Cl. ....................................... 71/27; 71/64 E; 252/381; 427/221
[58] Field of Search ................ 71/1, 11, 27, 54, 64 A, 71/64 R, 64 C, 64 E, 64 F; 427/212, 215, 220, 221; 252/381

[56] References Cited

U.S. PATENT DOCUMENTS

| 3,234,003 | 2/1966 | Sawyer, Jr. et al. | 71/27 |
| 3,690,391 | 9/1972 | Jasnosz, Jr. | 71/64 E |

Primary Examiner—Charles N. Hart
Assistant Examiner—Ferris H. Lander
Attorney, Agent, or Firm—Frank T. Johmann; Roland A. Dexter

[57] ABSTRACT

An anticaking composition suitable for fertilizers comprising a hydrophobic liquid having dissolved therein from 0.01 to 20% by weight of an alkylaryl sulphonate derived from an alkylaryl sulphonic acid of molecular weight greater than 400.

Also covered are fertilizer granules, e.g. NPK fertilizers coated with this anticaking composition.

16 Claims, 2 Drawing Figures

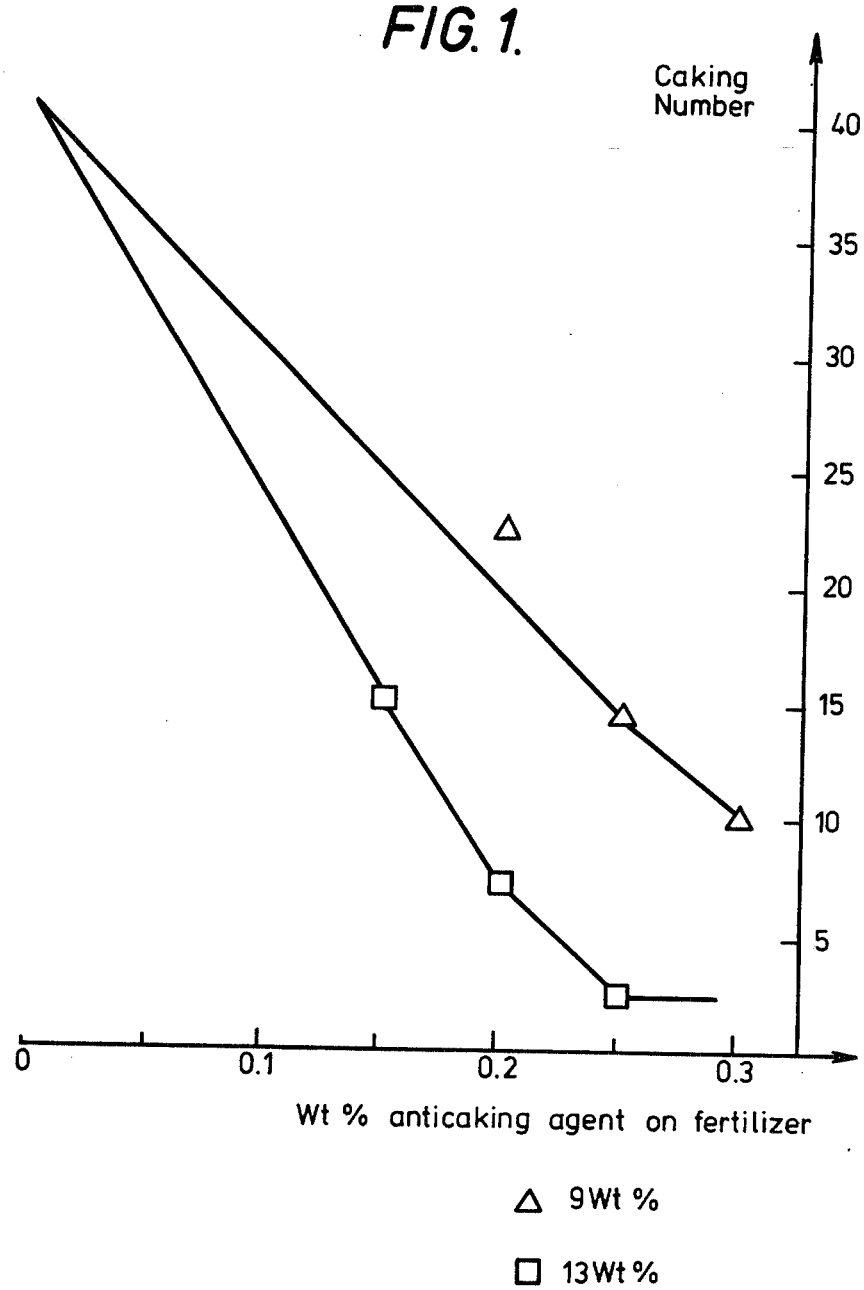

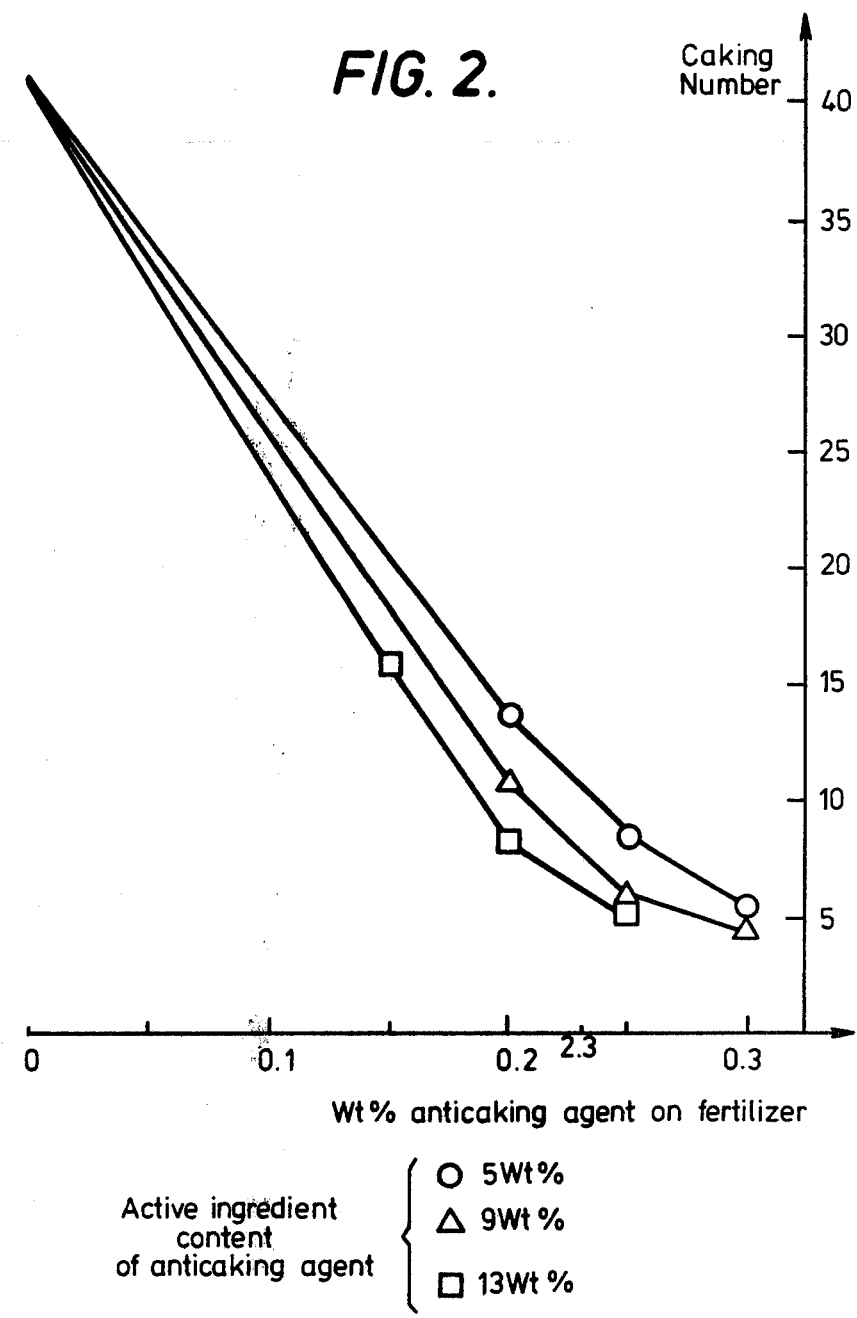

ANTICAKING COMPOSITIONS

This is a continuation of application Ser. No. 728,970, filed Oct. 4, 1976 and now abandoned.

The present invention relates to anticaking compositions for application to fertilizers to reduce the tendency of the fertilizer particles to agglomerate and form large bulky lumps during storage.

It is well known that fertilizer particles tend to agglomerate during storage to form lumps that can become extremely big in bulk storage. It has been suggested in for example U.S. Pat. No. 2,772,833 and British Pat. No. 755516 that this problem may be overcome by spraying the fertilizer granules with an aqueous solution of an alkylaryl sulphonate. However, although this reduces the tendency of the fertilizer to cake since the presence of water is the prime cause of caking the use of an aqueous solution is not entirely satisfactory. It has also been proposed to coat the granules with a hydrophobic liquid such as a hydrocarbon oil and since it is important that the hydrocarbon oil be compatible with the normally aqueous surface of the granules it has been proposed in for example Belgian Pat. No. 568338 to include fatty acids or fatty amines in the hydrophobic liquid to improve the compatibility of the liquid with the granules. This technique suffers from the disadvantage that the fatty acids have low anticaking activity whilst the fatty amines have a limited solubility in hydrophobic liquids at room temperature so it is generally necessary to store the solutions at elevated temperatures which is expensive. Furthermore the solutions of the fatty amines must be applied at temperatures higher than that at which the fertilizer is stored thus requiring further expense.

We have now found that a hydrophobic liquid containing an alkylaryl sulphonate derived from an alkylaryl sulphonic acid of molecular weight greater than 400 is a particularly suitable anticaking agent especially at the normal temperatures used for storing fertilizers.

The present invention therefore provides an anticaking composition comprising a hydrophobic liquid having dissolved therein at least 0.01% and preferably from 0.01% to 20% by weight of an alkylaryl sulphonate derived from an alkylaryl sulphonic acid of molecular weight greater than 400.

The present invention further provides a method for reducing the tendency of fertilizers to cake comprising coating fertilizer granules with a solution containing at least 0.01% and preferably from 0.01% to 20% by weight of an alkylaryl sulphonate derived from an alkylaryl sulphonic acid of molecular weight greater than 400 in a hydrophobic liquid.

The invention also provides fertilizer granules coated with an anticaking composition comprising a hydrophobic liquid having dissolved therein at least 0.1% and preferably from 0.01% to 20% by weight of an alkylaryl sulphonate derived from an alkylaryl sulphonic acid of molecular weight greater than 400.

In order to reduce caking tendencies fertilizer granules are sprayed with an anticaking composition after drying and the anticaking composition is most conveniently sprayed onto the dried granules at the end of the manufacturing process particularly when the granules are in a rotating drum which helps towards uniform coating. The techniques of the present invention are particularly useful in reducing the caking tendency of nitrogenous fertilizers, especially the complex Calcium Ammonium Nitrate, N.P.K. and ammonium nitrate fertilizers. These materials are highly hydrophilic and tend to cake when they are damp and this caking tendency is thought to be reduced by the anti-caking composition acting as a waterproofing layer for the granules. It is therefore preferred that the anticaking composition be applied shortly after the drying step in the process of fertilizer manufacture.

The hydrophobic liquid of the composition of our invention therefore acts as a waterproofing layer and the presence of the sulphonate enhances compatibility of the liquid with the surface of the fertilizer granules both on application of the composition and under the conditions at which the fertilizer is stored.

The choice of the hydrophobic liquid that is used in the compositions of the present invention will depend upon the character of the surface of the fertilizer granules and the method by which the composition is applied to the fertilizer. Any suitable liquid that has a sufficiently high flash point to ensure that there are no fire hazards may be used. Examples of hydrophobic liquids include both paraffinic and naphthenic mineral oils and also synthetic fluids such as synthetic isoparaffins, esters of synthetic or natural acids or polyacids with synthetic or natural alcohols or polyols. We prefer to use a mineral oil and where the composition is sprayed onto the fertilizer we prefer to use an oil having a suitable viscosity at the spraying temperature. Many conventional sprayers operate at around 70° C. and in these circumstances we prefer to use a mineral oil of viscosity from 5 to 20, preferably from 10 to 15 centistokes at the spraying temperature.

The alkylaryl sulphonate used in the compositions of the present invention must be soluble in the hydrophobic liquid and we find that alkylaryl sulphonates derived from alkylaryl sulphonic acids of molecular weight greater than 400 should be used. In particular we prefer to use sulphonates derived from alkylaryl sulphonate acids of a molecular weight greater than 460 especially those acids having a molecular weight in the range 480 to 530. The sulphonates used may be a mixture of sulphonates derived from sulphonic acids of different molecular weights and in this situation the reference to the molecular weight is to the average molecular weight of the sulphonic acids from which the sulphonates are derived. The sulphonate may be an alkali or alkaline earth metal sulphonate or may be the sulphonate of a nitrogen containing compound such as ammonia, ethanolamine, ethoxy amines or fatty acid amines.

The amount of sulphonate or sulphonate mixture that should be used is not critical providing it is sufficient to ensure that the hydrophobic liquid is compatible with the surface of the fertilizer granules and remains so during storage of the fertilizer. We find that the composition should contain at least 0.01% by weight of the sulphonate and from an economic point of view one uses as little as possible and we find that compositions containing from 0.01 to 20% preferably from 0.5 to 15% especially from 1% to 15% are particularly suitable. The amount of the composition that should be applied to the fertilizer depends upon the chemical nature and the morphology of the fertilizer. We find however that good anticaking may be achieved using from 0.005 wt.% to 0.4 wt.% of the composition based on the weight of the fertilizer.

The compositions of the present invention may contain other anticaking agents in addition to the sulphonates. The need for extra anticaking agents depends upon the nature of the fertilizer but we have found that a composition of this invention also containing a fatty amine is a particularly effective anticaking agent especially with Calcium Ammonium Nitrate fertilizers. We have found a solution of an ethanolamine sulphonate and a fatty amine to be particularly useful. We also find that we can use the fatty amines that have hitherto required special heating when used as anticaking agents without the need for this special heating since the presence of the sulphonate seems to aid the solubility of the amine. Any suitable fatty amine may be used and may be saturated or unsaturated and we prefer that it contains at least 12 carbon atoms. Most commercially available fatty amines are mixtures of amines and we have found that those containing predominantly amines with 16 and 18 carbon atoms are especially useful. We have found that compositions containing from 0.1% to 10% by weight preferably from 1% to 4% by weight of the composition of the amine are particularly useful. Fatty acids may be included as well as or instead of the fatty amine but these are less effective.

It is known to treat fertilizers with powders such as chalk or diatomasseous earth to reduce their tendency to cake. The compositions of the present invention may be used in combination with powder treatment and this is our preferred method with NPK fertilizers. The powder and the composition of our invention may be applied to the fertilizer simultaneously or sequentially but we have found that with NPK fertilizers especially good results are obtained if the fertilizer is first treated with the powder and then with the composition of the present invention.

The compositions of our invention may be used with most types of fertilizer and they tend to work better the dryer the fertilizer and we prefer that the fertilizer contain less than 0.4 wt.% more preferably less than 0.35 wt.% of water. Our compositions are therefore preferably applied shortly after the drying stage of the manufacturing process. The compositions are especially useful with the nitrogeneous fertilizers such as Calcium Ammonium Nitrate where we prefer to use composition that also contain a fatty amine and the NPK fertilizers where we prefer to first treat the fertilizer with a powder.

The present invention is illustrated but in no way limited by reference to the following examples in which the degree of caking of the fertilizer is measured according to the "caking number" which is a number characterising the effort needed to disintegrate the fertilizer. In the test the fertilizer is stored under a standard pressure of 40 kilogrammes per square centimeter in a split cylinder for 24 hours and the force required to separate the two parts of the cylinder is measured and converted according to the formula:

$n$ = separating force (in grams)/38 to give n the caking number of the fertilizer. A caking number of less than 20 indicates satisfactory anticaking but less than 10 is preferred.

EXAMPLE 1

17% by weight of the sodium salt of an alkylaryl sulphonic acid of molecular weight 520 was dissolved in a paraffinic mineral oil having a viscosity of 3.55 centistokes at 100° C. and 11.3 centistokes at 50° C. This solution was then sprayed onto dried Calcium Ammonium Nitrate fertilizer based on a filler comprising 75 wt.% Belgian chalk and 25 wt.% Welsh chalk and containing about 26% Nitrogen, 13% Ammonia and 0.34 wt.% water 0.23 to 0.25 wt.% water. 0.23 to 0.25 wt.% of the composition was applied to the fertilizer as it passed through a coating drum for storage and the fertilizer then stored. No sign of caking appeared after several months storage in bulk or in bags.

EXAMPLE 2

Various amounts of the sulphonate solution used in Example 1 were applied to the fertilizer of Example 1 to give different treat rates of sulphonate on fertilizer and each freshly treated sample subjected to the caking test with the following results:

| Wt. % of Sulphonate Solution of Fertilizer | Caking Number |
|---|---|
| 0 | between 40 and 60 |
| 0.20 | between 12 and 17 |
| 0.25 | between 9 and 14 |
| 0.30 | between 4 and 10 |

For the sake of comparison the fertilizer was treated with the same oil but containing no sulphonate at treat rates of from 0.2 to 0.40% by weight of oil on the fertilizer and in all instances the caking number was between 20 and 30.

EXAMPLE 3

The mono-ethanolamine salt of the sulphonic acid from which the sodium sulphonate of Example 1 was derived was prepared and separately dissolved in the same oil as was used in Example 1 to give a 9% and a 13% by weight solution. These solutions were applied to the same fertilizer as was used in Example 1 at various treat rates and the caking number of the fertilizers measured and the results are shown in the attached FIG. 1.

EXAMPLE 4

The techniques of Example 2 were repeated using the diethanolamine salt of the sulphonic acid rather than monoethanolamine salt and three solutions at 5 wt.%, 9 wt.% and 13 wt.% of sulphonate were used. The caking number of the fertilizer at various treated rates are shown in FIG. 2.

EXAMPLE 5

The sulphonate used in Example 1 was blended with an equal amount of a 20% fatty amine solution (commercially available as Noram SH) and applied to 200 tons of the fertilizer to a 0.2 wt.% treat rate in the same way as in Example 1 to give a caking number between 7 and 12. After 6 months storage both in bags and in bulk the fertilizer was easily handled in normal use.

EXAMPLE 6

The anticaking agent of Example 1 was applied to 2000 tons of a similar fertilizer to that used in Example 1 except that the anticaking agent was applied immediately after the fertilizer had been dried in its manufacturing process rather than after transportation to the laboratory as in Example 1 to give a treat level of 0.25 wt.% of anticaking agent based on the fertilizer.

The caking number of this fertilizer was less than 4 and the material was easily handled after bulk storage for 6 weeks and after 6 months storage in bags.

When a sample of fertilizer was taken to the laboratory after production and the anticaking agent then applied the average caking number was 8.

EXAMPLE 7

A composition comprising the sulphonate solution of Example 1 containing in addition 1.4 wt.% of a commercially available fatty amine containing 30% $C_{16}$ amines and 60% $C_{18}$ amines was applied to the same type of fertilizer as was used in Example 1 immediately upon completion of fertilizer manufacture to give treat rates of 0.10 wt.%, 0.15 wt.% and 0.20 wt.% based on the fertilizer.

The caking index of these fertilizers was as follows:

| Treat Rate | Caking Number |
| --- | --- |
| 0.10% | 4 |
| 0.15% | about 4 |
| 0.20% | 4 |

The caking number of the untreated fertilizer was from 10 to 12.

EXAMPLE 8

Two commercially available Calcium Ammonium Nitrate Fertilizers containing 26 wt.% Nitrogen were coated with various anticaking compositions and the caking number measured with the following results:

| Anti-Caking Composition | Treat Rate Wt. % Fertilizer | Fertilizer/ Caking Number A | B |
| --- | --- | --- | --- |
| Sodium Sulphonate of Example 1 | 0 | 132 | 41 |
| | 0.2 | 14 | 35 |
| Sodium Sulphonate of Example 1 + 1% Fatty Amine | 0.1 | 9 | 7 |
| Sodium Sulphonate of Example 1 + 2% Fatty Amine | 0.1 | 7 | 4 |
| 1% Fatty Amine alone | 0.1 | 75 | |
| 2% Fatty Amine alone | 0.1 | 20 | |
| Ethanolamine sulph-onate of Example 4 + 1% Fatty Amine | 0.1 | 11 | 8 |
| Ethanolamine Sulph-onate of Example 4 + 2% Fatty Amine | 0.1 | 7 | 5 |

EXAMPLE 9

An ammonium nitrate fertilizer containing 36 wt.% nitrogen which untreated had a caking number of 32 was treated with the ethanolamine sulphonate solution of Example 4 containing 1% of a fatty amine to a treat rate of 0.1 wt.% based on the fertilizer.

The caking number of the treated material was found to be 4.

EXAMPLE 10

An NPK fertilizer containing 17 wt.% Nitrogen, 2 wt.% Phosphorous and 27 wt.% Potassium was subjected to the various treatments summarised below and the caking number of each sample measured,

| | Caking Number |
| --- | --- |
| Fertilizer + 1 wt. % diatommaceous earth | 69 |
| Fertilizer + 1 wt. % diatommaceous earth + 0.2 wt. % of Sodium Sulphonate Solution of Example 1 (Sequential treatment) | 4 |
| Fertilizer + 0.2 wt. % of Sodium Sulphonate solution of Example 1 + 1 wt. % diatommaceous earth (Sequential treatment) | 32 |
| Fertilizer + 0.2 wt. % of Sodium Sulphonate solution and 1 wt. % diatommaceous earth (simultaneous treatment) | 15 |
| Fertilizer + 0.2 wt. % of Sodium Sulphonate solution of Example 1 | 42 |
| Fertilizer + 0.2 wt. % of Sodium Sulphonate solution of Example 1 containing 1.4 wt. % of a Fatty Amine | 54 |

It should be appreciated that there is considerable variation of properties within a bulk fertilizer and from one batch to another of fertilizers produced in the same manner particularly in the morphology and water content of the fertilizer. Thus, the values given for caking number are average values and the purpose of including the values is to show the trend obtained when using the various anticaking compositions.

We claim:

1. Fertilizer granules coated with a hydrophobic layer in an amount ranging from 0.005 to 0.4% by weight based on the weight of said fertilizer, said hydrophobic layer comprising mineral oil having dissolved therein from 0.01 to 20% by weight of an alkylaryl sulfonate of a nitrogen-containing compound, said sulfonate derived from a synthetic alkylaryl sulfonic acid of molecular weight greater than 400.

2. The fertilizer granules according to claim 1 wherein said nitrogen-containing compound is selected from ammonia, ethanolamine, ethoxy amines and fatty acid amines and said hydrophobic layer ranges from 0.2 to 0.4% by weight.

3. The fertilizer granules according to claim 2 wherein said sulfonic acid has a molecular weight in the range of 480 to 530.

4. The fertilizer granules according to claim 2 wherein said alkylaryl sulfonate is the diethanolamine salt of a synthetic sulfonic acid of molecular weight 520.

5. In a method for reducing the tendency of fertilizers to cake wherein fertilizer granules are coated with an anticaking composition to provide a hydrophobic layer thereby curtailing absorption of water by the granule, the improvement of providing said hydrophobic layer in an amount ranging from 0.005–0.4% by weight based on the weight of the fertilizer by coating said fertilizer granules with an anticaking composition comprising mineral oil having dissolved therein from 0.01 to 20% by weight of an alkylaryl sulfonate of a nitrogen-containing compound, said sulfonate derived from a synthetic alkylaryl sulfonic acid of molecular weight greater than 400.

6. In the method according to claim 5 wherein said nitrogen-containing compound is selected from ammonia, ethanolamine, ethoxy amines and fatty acid amines and said hydrophobic layer ranges from 0.2 to 0.4% by weight.

7. In a method according to claim 6 wherein said sulfonic acid has a molecular weight in the range of 480 to 530.

8. In a method according to claim 6 wherein said alkylaryl sulfonate is the diethanolamine salt of said sulfonic acid.

9. Fertilizer granules coated with a hydrophobic layer in an amount ranging from 0.005–0.4% by weight based on the weight of said fertilizer, said hydrophobic layer consisting essentially of paraffinic mineral oil having dissolved therein the combination from about 0.01–20% by weight of an alkylaryl sulfonate derived from a synthetic alkylaryl sulfonic acid of molecular weight ranging from 480–530 and from 0.1–10% by weight of a fatty amine whereby the absorption of water by said fertilizer granules is curtailed.

10. The fertilizer granules of claim 9 wherein said sulfonate is an alkali or alkaline earth metal sulfonate.

11. The fertilizer granules of claim 9 wherein said sulfonate is the sulfonate of a nitrogen-containing compound selected from ammonia, ethanolamine, ethoxy amines and fatty acid amines.

12. The fertilizer granules of claim 9 wherein said fertilizer is calcium ammonium nitrate.

13. In a method for reducing the tendency of fertilizers to cake wherein fertilizer granules are coated with an anticaking composition to provide a hydrophobic layer thereby curtailing absorption of water by the granule, the improvement of providing said hydrophobic layer in an amount ranging from 0.005–0.4% by weight based on the weight of the fertilizer by coating said fertilizer granules with an anticaking composition consisting essentially of paraffinic mineral oil having dissolved therein the combination from about 0.01–20% by weight of an alkylaryl sulfonate derived from an alkylaryl sulfonic acid of molecular weight ranging from 480–530 and from 0.1–10% by weight of a fatty amine.

14. In a method according to claim 13 wherein said sulfonate is an alkali or alkaline earth metal sulfonate.

15. In a method according to claim 13 wherein said sulfonate is the sulfonate of a nitrogen-containing compound selected from ammonia, ethanolamine, ethoxy amines and fatty acid amines.

16. In a method according to claim 13 wherein said fatty amine is predominantly of amines containing 16 and 18 carbon atoms.

* * * * *